April 29, 1952　　　　R. J. WENSLEY　　　　2,595,032
PROTECTIVE RELAY FOR TRANSMISSION SYSTEMS
Filed Aug. 10, 1949
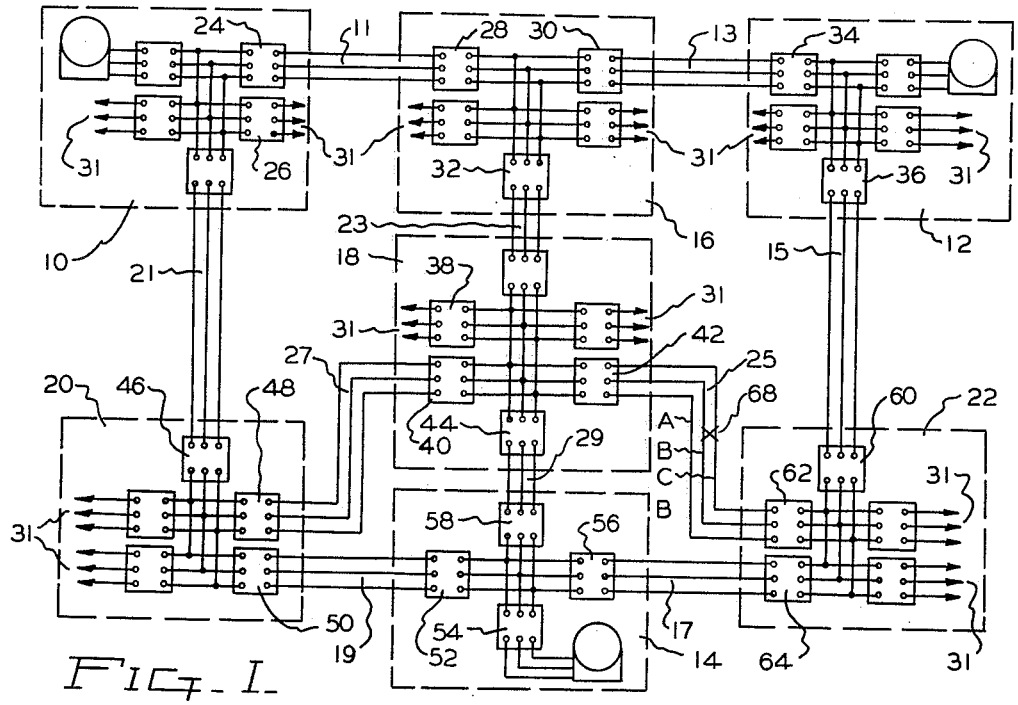
FIG. I
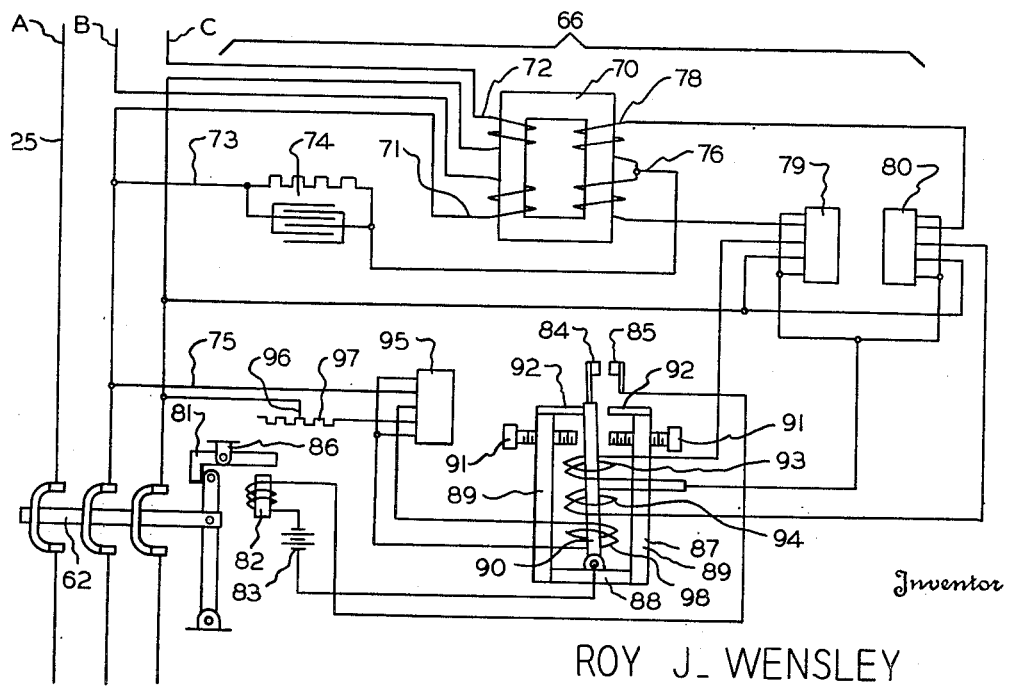
FIG. II
Inventor
ROY J. WENSLEY
By Beaman & Patch
ATTORNEYS Patented Apr. 29, 1952

2,595,032

UNITED STATES PATENT OFFICE 2,595,032

PROTECTIVE RELAY FOR TRANSMISSION SYSTEMS

Roy J. Wensley, Charlotte, Mich.

Application August 10, 1949, Serial No. 109,524

2 Claims. (Cl. 175—294)

1

The present invention relates to improvements in electrical transmission systems being particularly concerned with distance relay mechanism for quickly isolating and taking out of service that section of the system to which a fault occurs without taking any other portion of the system out of service.

In general, my improved relay mechanism and resulting system locates the fault by measuring the inductive reactance of the circuit between an associated breaker and a point at which the fault occurs.

Thus one of the objects of the invention is to provide an improved relay for isolating sections of an electrical transmission system in which a power interrupting device is controlled by the value of the inductive reactance of the power circuit between the power interrupting device and the circuit fault.

Another object is to provide an improved relay as defined in the preceding paragraph which embodies the use of a single transformer.

A further object is to provide a distance relay system for isolating sections of electrical transmission circuits in which faults occur wherein the potential circuit comprises an adjustable resistor used as an artificial line with rectifying means supplied through the artificial line to produce a uni-directional resultant current proportional to the voltage of the power circuit.

A still further object of the invention is to provide a relay of the type described comprising a transformer with the coils thereof disposed with reference to the phase conductors, whereby the voltage for a corresponding phase of the circuit produces a vector sum and a vector difference proportional to an arithmetic function of the reactive volt amperes flowing into the power circuit; the vector sum and vector difference being rectified to produce uni-directional results proportional thereto.

These and other objects and advantages residing in a specific arrangement, construction and combination of parts will be more fully appreciated and understood from a consideration of the following specification and the appended claims.

In the illustrated form of the invention,

Fig. I is a diagrammatic layout of an electrical generating and transmitting system to which the invention is shown applied, Fig. II is a diagrammatic showing of the distance relay.

Referring to Fig. I, in the electrical transmission system diagrammatically shown, generating

2 stations 10, 12 and 14 serve different sections of the system through sub-stations 16, 18, 20 and 22. Circuit breakers, indicated by even reference numbers 24 to 64 inclusive, are shown between the sub-station and in the event of a fault each circuit breaker is under the regulation of a distance relay unit 66 of the construction shown in Fig. II.

As shown, the generating stations 10, 12 and 14 and sub-stations 16, 18, 20 and 22 are linked into networks by the transmission lines indicated by odd reference numbers 11 to 29, inclusive. Local loads are indicated by arrow symbols 31.

To be more fully described hereinafter, each circuit breaker 24, 26, etc. is provided with a distance relay unit 66 which measures the inductive reactance; being provided for the purpose of tripping only those circuit breakers at each end of a faulted section. For example, the distance relay associated with circuit breaker 24, of the line 11, is calibrated to trip on a fault between the circuit breaker 24 and the terminals of the circuit breaker 28.

If a fault 68 is assumed between the phase conductors B and C of the line 25, electrical energy will flow from the stations 10, 12 and 14 to the fault 68. Generating station 14 will feed sub-station 18 through a line 29. Power will also flow through line 19, sub-station 20 and line 27. Line 17 will also feed energy to sub-station 22. In like manner, the other generating stations 10 and 12 will feed power to the fault 68 through similar paths.

The distance relay unit 66 associated with the circuit breaker 58 will measure the inductive reactance of the line 29 and that portion of the line 25 to the fault 68. As this value will be higher than that to circuit breaker 44, the fault 68 will not open the circuit breaker 58. Also, as will be more fully described, circuit breaker 44 will not be opened by the fault 68 because of the directional function of the distance relay unit 66. Thus the power flow into the sub-station bus bar will not trip the circuit breakers regardless of the amount. For similar reasons the fault 68 will not open the circuit breakers 40, 48, 50, 52 and 56.

The fault 68 will cause the relay unit 66 associated with the circuit breaker 42 to open the same because the inductive reactance of line 25 between the circuit breaker 42 and the fault 68 will be less than that for which the relay unit is calibrated. Likewise, the circuit breaker 62 will be opened because the inductive reactance of line 25 to the fault 68 will be less than that for which the associated relay unit 66 is calibrated.

With respect to the various other paths to the fault 68 not specifically treated above, analysis of each possible path will show that only the relay units 66 associated with the circuit breakers 42 and 62 will find values below their respective calibration, thus only these circuit breakers will be tripped. In this manner the fault 68 will cause a minimum disturbance to local load feeders from each station bus as the line 68 will be disconnected from the network so quickly that motors will not be stopped and lights will blink a negligible amount.

To provide against failure of the circuit breakers 42 and 62 to isolate the line 25 in which the fault 68 occurred, the provisions of sequence timers in the relay unit 66 is anticipated to give back-up protection. For example, should the circuit breaker 62 fail to open when the fault 68 occurs in line 25, second zone elements may be provided in the relay unit 66 associated with the circuit breakers 36 and 56 and calibrated for the inductive reactance of a major portion of the shortest line beyond the next sub-station. In this case the calibration point would be the circuit breaker 42. After a suitable short interval, such as a half second, the sequence timers connect the trip circuits and the circuit breakers 36 and 56 will be opened to isolate substation 22 and its local loads 31. Service of the station is thus sacrificed to maintain the rest of the system.

Referring to Fig. II, one of the distance relay units 66 associates with each of the circuit breakers, as for example, the circuit breaker 62 of the line 25, is shown in detail and then only in connection with the phase BC. It will be understood that the phase AB and AC are connected and protected in a similar manner.

As shown, the relay unit 66 of the phase BC comprises a current transformer 70 having primary coils 71 and 72 in series with phase conductors B and C. A potential circuit 73 has a phase advancing unit 74 having resistance and capacitance with one side connected to the mid-point 76 of the secondary coil 78. The other side of the potential circuit 73 is connected to the midpoint of the full wave rectifiers 79 and 80 and the current dividing equally in flowing through the two halves of the coil 78 of the transformer 70.

As will be readily appreciated by those skilled in the art, the transformer 70 has for its function obtaining the vector sum and the vector difference of the current from the phase conductors B and C and the voltage from the potential circuit 73. The vector sum is sent through the rectifier 79 if the power flow is in one direction and through the rectifier 80 if the flow is reversed. In each case the remaining rectifier receives the vector difference. The resultant direct current from rectifier 79 flows through the coil 93 and that of the rectifier 80 flows through the coil 94. These coils are wound so that the magnetomotive forces oppose one another and the result is a flux strength equal to the algebraic sum.

In practice the circuit breaker 62 may take many forms. As diagrammatically illustrated, the latch 81 holds the breaker 62 in the closed position. When the solenoid 82 is energized by the source 83 upon closing the contacts 84 and 85, the latch 81 will be partially rotated anti-clockwise about the pivot 86 to release the breaker 62 to any suitable opening action.

Relay 87 may be of well known polar construction with a permanent magnet 88 and ferrous pole pieces 89. The soft iron armature 90 is biased by the flux of the adjacent pole and tends to remain in either extreme position. Adjustable pole pieces 91 control the strength of the magnetic bias while non-magnetic stops 92 limit the travel of the armature 90. A small reversal of the flux derived from the coils 93 and 94 surrounding the armature 90 will cause it to move from one pole to the other. Movement of the armature 90 carried contact 84 into engagement with the contact 85 to energize the solenoid 82 to trip the latch 81 opening the circuit breaker 62.

A restraint circuit for the relay 87 is provided by a potential circuit 75 including a rectifier 95 and a variable resistor 97. This circuit is always directly proportioned to the voltage impressed on the section of the system being protected and the amount of current in this circuit is adjusted by the slider 96 of the resistor 97 to a value proportional to the calculated or measured inductive reactance of the transmission line connected to the circuit breaker 62. This is herein termed the "artificial line."

The flux of the coil 98 of the "artificial line" circuit just described will always be such as to hold the relay contacts 84 and 85 apart. If the power flow is toward the transmission line, the algebraic sum of the flux in the coils 93 and 94 will tend to close the contacts 84 and 85. When the power flow is from the transmission line toward the generator the algebraic sum of the flux in the coils 93 and 94 will tend to assist the flux in the restraint coil 98 in holding the contacts 84 and 85 open.

When the fault 68, for example, occurs in the transmission network the voltage drop due to the heavy fault current through the impedance of the lines will cause reduction in voltage of considerable magnitude. As the net results of the flux in the coils 93 and 94 is the difference between the vector sum and the vector difference of the current and voltage, the resultant will be a value that varies directly with the voltage. The amount of current flowing will be that value produced by the voltage at that moment impressed on a circuit having a certain inductive reactance.

Knowing the inductive reactance of the line 25, for example, the value of resultant of the previous paragraph can be determined for the line 25. If this resultant is less than the calculated value in the relay 66, the circuit breaker 62 should not close the contacts 84 and 85. If the resultant is greater than the calculated value, the relay 66 should close the contacts 84 and 85, tripping the circuit breaker 62. To set the tripping point of the relay 66 at this value, the "artificial line" is adjusted so that the current in the restraint coil 98 produces a flux just equal to that produced by the coils 93 and 94 less the small amount required to move the armature 90. As the restraint coil 98 is supplied from the same source as the fault 68, the restraint will vary directly as the applied voltage and the "artificial line" will always form a true balance with the resultant of the fault current.

I claim:

1. A distance relay system for the isolation of a faulted section of three-phase electrical transmission lines comprising circuit breakers disposed at the terminal of phase conductors of known inductive reactance, a multi-coil transformer, means connecting said transformer with two of said conductors as to combine the currents from two phases of said conductors with the voltage from corresponding phases of said conductors to produce a vector sum current and a vector difference current proportional to an arithmetic function of the reactive volt amperes flowing through said two conductors, first rectifying means connected to said transformer output for said vector sum current and second rectifying means connected to said transformer output for said vector difference current to produce unidirectional resultant currents proportional to said vector sum current and vector difference current, a potential circuit connected to said two conductors functioning as an artificial line including an adjustable resistor and third rectifying means to produce a unidirectional resultant current proportional to the voltage of said two conductors, control means for said circuit breakers, and relay means responsive to the algebraic sum of unidirectional currents of said first, second and third rectifying means to actuate said control means when the inductive reactance of said phase conductors between said circuit breakers falls below said known value a predetermined amount.

2. A distance relay system for the isolation of a faulted section of three-phase electrical transmission lines comprising circuit breakers disposed at the terminals of phased conductors of known inductive reactance, a multi-coil transformer, means connecting said transformer with two of said conductors as to combine the currents from two of said conductors with the voltage from corresponding conductors to produce a vector sum current and a vector difference current proportional to an arithmetic function of the reactive volt amperes flowing through said conductors, first rectifying means connected to said transformer output for said vector sum current and second rectifying means connected to said transformer output for said vector difference current to produce unidirectional resultant currents proportional to said vector sum current and vector difference current, a potential circuit connected to said two conductors functioning as an artificial line including an adjustable resistor, third rectifying means to produce a unidirectional resultant current proportional to the voltage of said two conductors, control means for said circuit breaker, relay means responsive to the algebraic sum of the resultants of said unidirectional currents of said first, second and third rectifying means to actuate said control means when the inductive reactance in said phase conductors between said circuit breakers falls below said known value, said relay means including a restraint coil in the circuit of said artificial line.

ROY J. WENSLEY.

REFERENCES CITED

The following references are of record in the file of this patent:

UNITED STATES PATENTS

| Number | Name | Date |
|---|---|---|
| 1,732,977 | Mayr | Oct. 22, 1929 |
| 1,831,338 | Brown | Nov. 10, 1931 |
| 2,201,829 | Heinrich | May 21, 1940 |
| 2,208,907 | Leyburn et al. | July 23, 1940 |
| 2,393,983 | Goldsborough | Feb. 5, 1946 |
| 2,426,062 | Sonnemann | Aug. 19, 1947 |